(No Model.)
W. I. FISH.
ATTACHMENT FOR CULTIVATORS.
No. 311,970. Patented Feb. 10, 1885.
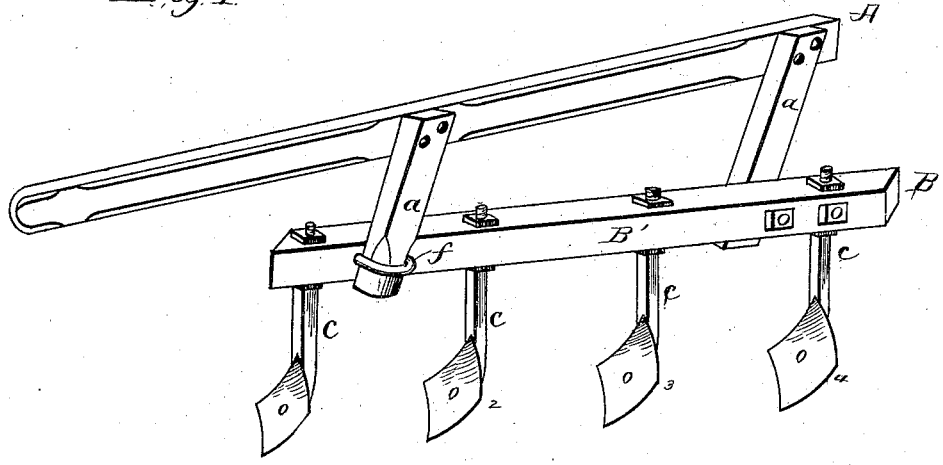
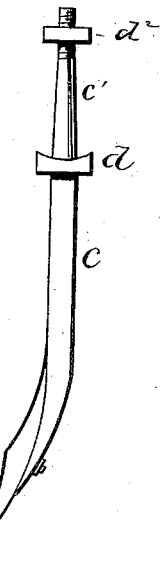
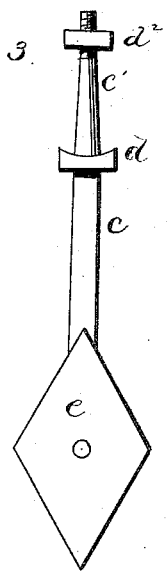
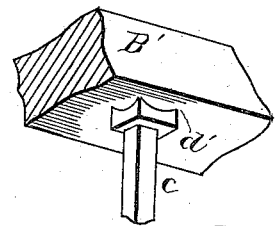
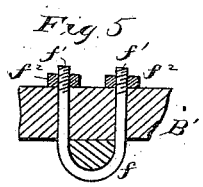
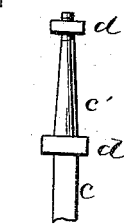
Witnesses:
Wm. A. Rosenbaum
D. P. Cowl
Inventor
Washington I. Fish
by J. S. Duffié
Atty.

UNITED STATES PATENT OFFICE.

WASHINGTON I. FISH, OF AMBOY, ILLINOIS.

ATTACHMENT FOR CULTIVATORS.

SPECIFICATION forming part of Letters Patent No. 311,970, dated February 10, 1885.

Application filed June 2, 1884. (No model.)

*To all whom it may concern:*

Be it known that I, WASHINGTON I. FISH, a citizen of the United States, residing at Amboy, in the county of Lee and State of Illinois, have invented certain new and useful Improvements in Attachments to Cultivators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention has relation to corn-cultivators and the tooth-standards of right and left attachments to a common plow or cultivator which are designed to straddle the row in cultivating young corn before the larger and ordinary plow can be used to advantage.

In the accompanying drawings, Figure 1 represents a plow-beam, A, with standards $a$ $a$, to which the cultivating attachments B are secured. The right-hand cultivating attachment is not shown, as it is exactly similar to the left-hand one shown. Figs. 2, 3, 4, 5, and 6 are detail views of my attachment.

These attachments B are attached by clasps $f$ to the plow-standards $a$ of any make of corn-plow, whether made of wood or iron, the regular shovel being first removed, to be again replaced when the corn becomes larger.

The drawings, Fig. 1, show but the left-hand attachment, the right being like unto it, and when both are attached they jointly form a V-shaped cultivator, the narrow end being to the front. The beam B' of the attachment B is made of wood, and is provided with perforations passing perpendicularly through the same equal distances apart, to receive the shanks $c'$ of the plow-standards $c$. The plow-standards $c$ are provided with shoulders $d$, which are welded to the standard $c$ at the lower end of the shank $c'$. This shoulder $d$ is first made in the form of a threadless nut, its upper face being scooped out in the center from side to side, as shown in Fig. 2, and from end to end, as shown in Fig. 3, leaving four perforations, $d'$, as shown in Fig. 4. In putting these standards $c$ into the beam B' the shank $c'$ is put through the perforations above mentioned, and the shoulders $d$ are brought up against the lower face of the beam. Fig. 4, the nut $d^2$ is put on the threaded end of the shank $c'$, and when the nut is turned down home it embeds points $d'$ into the low face of the said beam B', thus preventing the standards $c$ from turning. I prefer this method to that of having square holes with the shanks $c'$ square to fit them, because by my method I can turn the plow-points $e$ to any angle I may desire. The plow-points $e$ are diamond-shaped, with the bolt-hole in the center, so that I may use one point and then the other. These plow-points $e$ are made of different sizes, the second one being larger than the first, the third larger than the second, and the fourth larger than the third. I deem it important to thus make them of different sizes, as I think it will be advantageous to change them as circumstances require. The beam B' is also provided with four other perforations passing through the same for the reception of the bow-clamps $f$ $f$. These bow-clamps are provided with nuts $f^2$, which work on the threaded ends $f'$ of the bow-clamps $f$ and against the inner edge of the beam B'.

In applying the attachments I put the clasps $f$ around the standards $a$, and through the perforations in the beam, and the nuts on the threaded ends $f$, and turn them until I clasp the standards $a$ perfectly tight.

For ordinary work, where the soil is light, it will be sufficient to make the shoulders $d$ flat on its upper face, as shown in Fig. 6.

Having thus described my invention, what I claim as new, and desire to secure by Letters Patent, is—

In the attachment B to a corn-cultivator, the combination of beam B' with standard $c$, provided with shoulder $d$, having the concaves forming points $d'$, said shoulder being rigidly welded to standard $c$, shank $c'$, capable of being set at any angle, and nuts $d^2$, whereby points $d'$ may be embedded into the lower face of said beam and rigidly held thereon, substantially as shown and described, and for the purposes set forth.

In testimony whereof I affix my signature in presence of two witnesses.

WASHINGTON I. FISH.

Witnesses:
H. KLEIN,
ISAAC J. APPLETON.